(12) United States Patent
Nelson et al.

(10) Patent No.: US 12,705,378 B2
(45) Date of Patent: Aug. 11, 2026

(54) SYSTEM AND METHOD FOR SECURELY TRANSFERRING DATA USING PSEUDO RANDOMLY GENERATED TOKENS

(71) Applicant: Eclypses, Inc., Marco Island, FL (US)

(72) Inventors: Robert E. Nelson, Franktown, CO (US); Aron J. Seader, Keenesburg, CO (US)

(73) Assignee: Eclypses, Inc., Marco Island, FL (US)

( * ) Notice: Subject to any disclaimer, the term of this patent is extended or adjusted under 35 U.S.C. 154(b) by 100 days.

(21) Appl. No.: 18/609,589

(22) Filed: Mar. 19, 2024

(65) Prior Publication Data

US 2025/0298913 A1 Sep. 25, 2025

(51) Int. Cl.
*G06F 21/60* (2013.01)
*H04L 9/08* (2006.01)

(52) U.S. Cl.
CPC .......... *G06F 21/606* (2013.01); *H04L 9/0869* (2013.01)

(58) Field of Classification Search
CPC ............................ G06F 21/606; H04L 9/0869
See application file for complete search history.

(56) References Cited

U.S. PATENT DOCUMENTS 8,670,564 B1 3/2014 Clayton et al.
9,921,561 B2 3/2018 Schoenberger et al.
10,049,589 B1 8/2018 Boyd et al.
10,452,320 B2 10/2019 Schoenberger et al.
10,503,133 B2 12/2019 Schoenberger et al.
11,012,722 B2 5/2021 Reynolds
11,329,963 B2 5/2022 Reynolds
11,405,203 B2 8/2022 Nelson et al.
11,522,707 B2 12/2022 Nelson et al.
11,720,693 B2 8/2023 Seader et al.
11,770,370 B2 9/2023 Reynolds
11,979,498 B2 5/2024 Nelson et al.
2008/0298583 A1 12/2008 Ahmed (Continued)

FOREIGN PATENT DOCUMENTS

WO 2012/000091 1/2012

OTHER PUBLICATIONS

ASCII Table—ASCII Character Codes, HTML, Octal, Hex, Decimal, www.asciitable.com, accessed Jul. 11, 2024.

(Continued)

*Primary Examiner* — William S Powers
(74) *Attorney, Agent, or Firm* — Akerman LLP

(57) ABSTRACT

According to one example, a first computing device includes one or more processors. Following execution of one or more instructions, the processors determine data for transmittal to a second computing device, and break the data into one or more portions. For each of the one or more portions of the data, and following execution of one or more instructions, the processors determine a number associated with the respective portion of the data, pseudo randomly generate a number of transmittal tokens, select at least one transmittal token from the number of transmittal tokens, and replace the respective portion of the data with the selected at least one transmittal token. Following execution of the one or more instructions, the processors further transmit the one or more selected transmittal tokens for receipt by the second computing device.

19 Claims, 3 Drawing Sheets

(56) References Cited

U.S. PATENT DOCUMENTS

2010/0299529 A1 11/2010 Fielder
2013/0212666 A1* 8/2013 Mattsson ............. G06Q 20/385 726/9
2014/0126718 A1* 5/2014 Movshovitz ........ G06F 21/6227 380/28
2015/0350039 A1* 12/2015 Narasimhamurthy ....................... H04L 63/0245 709/224
2021/0390884 A1* 12/2021 Bush ..................... H04L 9/0861
2022/0284112 A1* 9/2022 Seader .................. G06F 21/606
2022/0284113 A1 9/2022 Nelson et al.

OTHER PUBLICATIONS

Bits and Bytes, https://web.stanford.edu/class/cs101/bits-bytes.html, accessed Jul. 11, 2024.

Eclypses, MTE Nano, Security for Resource-Constrained ioT Devices, www.linkedin.com/posts/eclypses-inc_mte-nano-security-for-resource-constrained-activity, accessed Jul. 11, 2024.

Eclypses, MTE Nano, Security for Resource-Constrained ioT Devices, https//eclypses.com/mte-technology/mte-nano/, accessed Jul. 31, 2024.

* cited by examiner

SYSTEM AND METHOD FOR SECURELY TRANSFERRING DATA USING PSEUDO RANDOMLY GENERATED TOKENS

TECHNICAL FIELD

This disclosure relates generally to the field of computer-based communication, and more specifically to a system and method for securely transferring data.

BACKGROUND

Typically, a device may transmit data to another device in an unsecured manner or using traditional security measures (e.g., Secure Sockets Layer (SSL) protocol). These traditional methods of transferring data, however, may be deficient.

SUMMARY

In a first example, a system includes a first computing device that has one or more memory units and one or more processors. Following execution of one or more instructions, the processor(s) determine data for transmittal to a second computing device, and break the data into one or more portions. For each of the one or more portions of the data, and following execution of one or more instructions, the processor(s) determine a number associated with the respective portion of the data, pseudo randomly generate a number of transmittal tokens, utilizing a first set of one or more pseudo random bit generators, based on the number associated with the respective portion of the data, select at least one transmittal token from the number of transmittal tokens, and replace the respective portion of the data with the selected at least one transmittal token. Following execution of one or more instructions, the processor(s) transmit the one or more selected transmittal tokens for receipt by the second computing device.

In a second example, a method includes determining data for transmittal to a second computing device, and breaking the data into one or more portions. For each of the one or more portions of the data, the method includes determining a number associated with the respective portion of the data, pseudo randomly generating, utilizing a first set of one or more pseudo random bit generators, a number of transmittal tokens, based on the number associated with the respective portion of the data, selecting at least one transmittal token from the number of transmittal tokens, and replacing the respective portion of the data with the selected at least one transmittal token. The method also includes transmitting the one or more selected transmittal tokens for receipt by the second computing device.

In a third example, a tangible non-transitory computer readable medium includes logic that may be executed by one or more processors of a first computing device. When executed, the logic is configured to determine data for transmittal to a second computing device, and break the data into one or more portions. For each of the one or more portions of the data, the logic is further configured, when executed, to determine a number associated with the respective portion of the data, pseudo randomly generate a number of transmittal tokens, utilizing a first set of one or more pseudo random bit generators, based on the number associated with the respective portion of the data, select at least one transmittal token from the number of transmittal tokens, and replace the respective portion of the data with the selected at least one transmittal token. When executed, the logic is further configured to transmit the one or more selected transmittal tokens for receipt by the second computing device.

BRIEF DESCRIPTION OF THE FIGURES

For a more complete understanding of the present disclosure and its features and advantages, reference is now made to the following description, taken in conjunction with the accompanying drawings, in which.

DETAILED DESCRIPTION

Figure 1A:
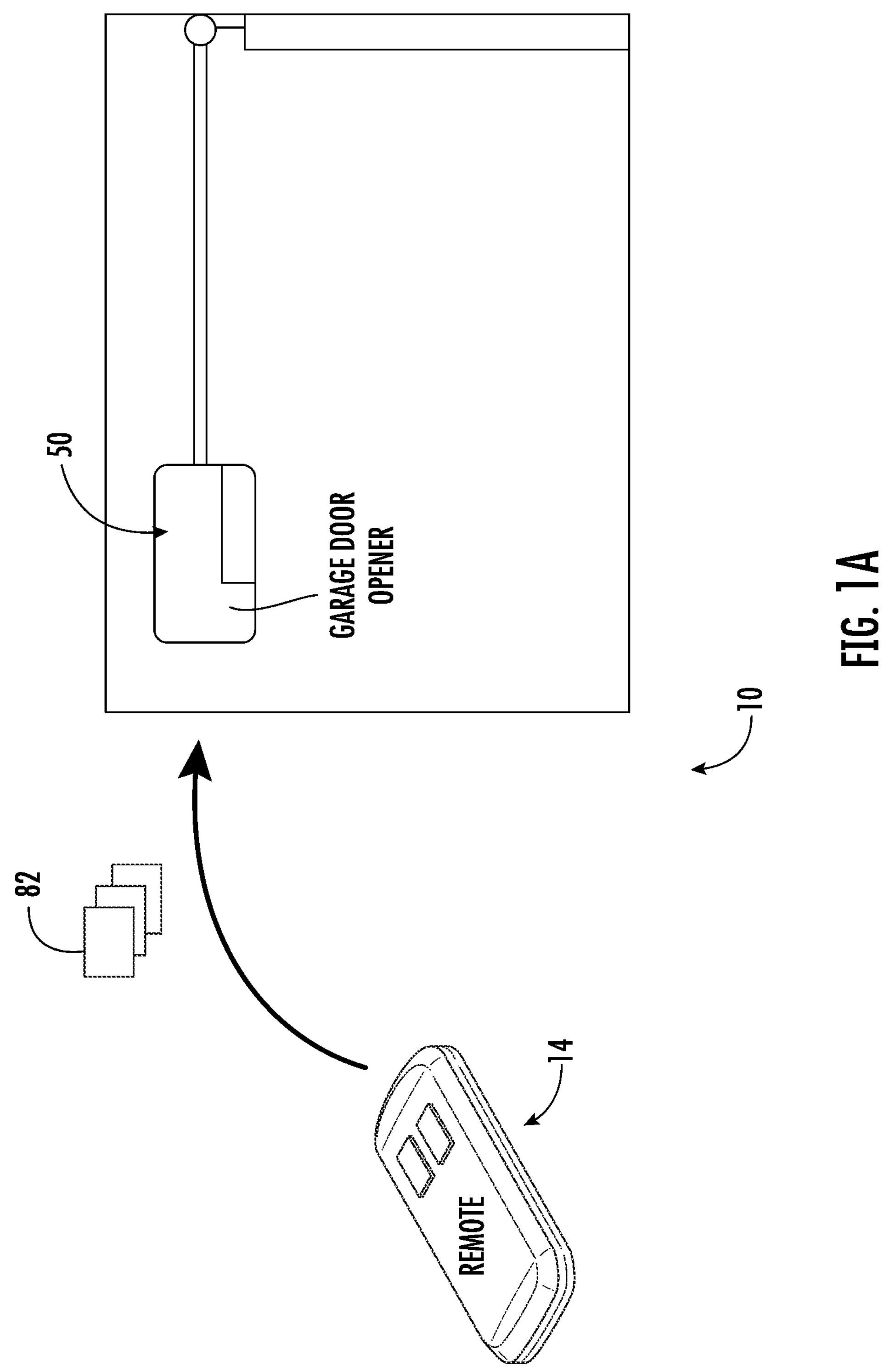
FIGS. 1A-1B illustrate an example system for securely transferring data.
Figure 1B:
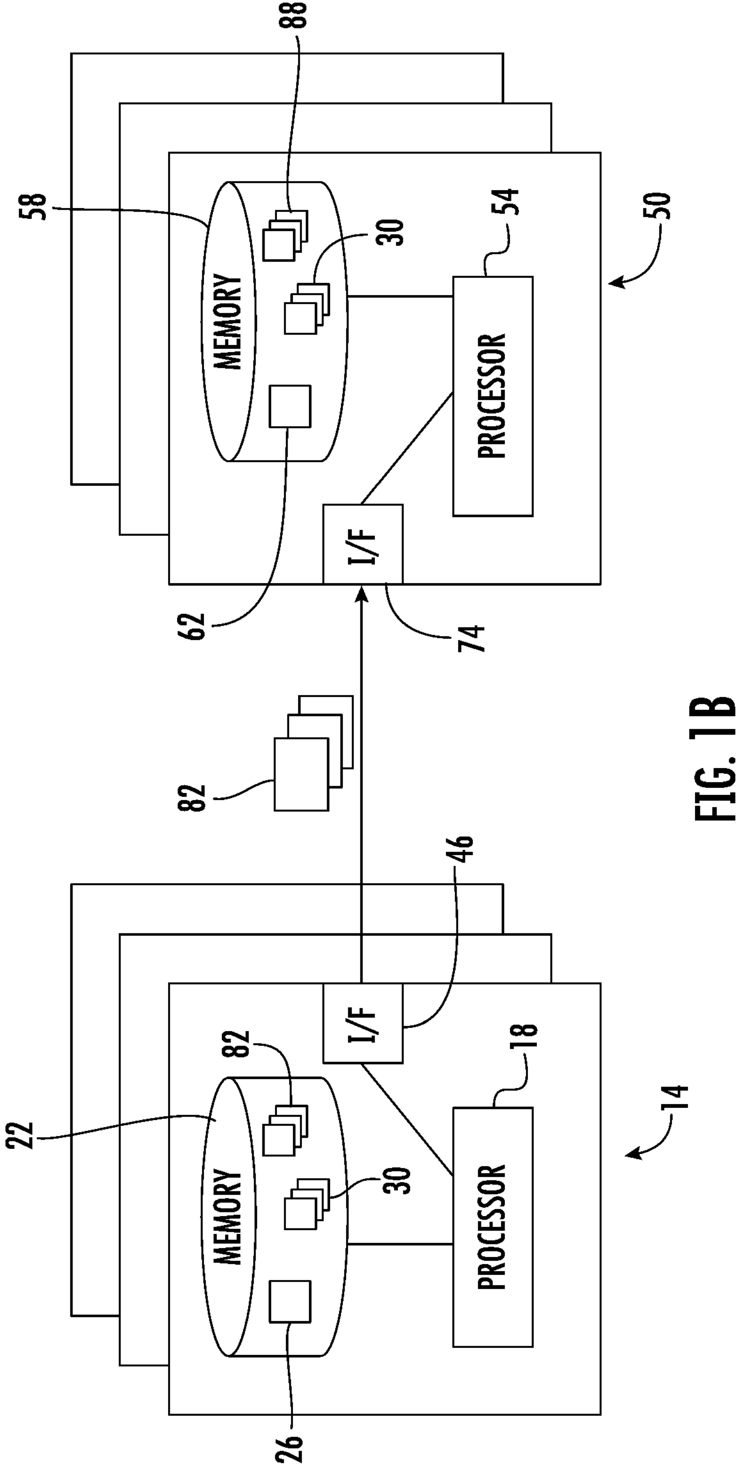
Figure 2:
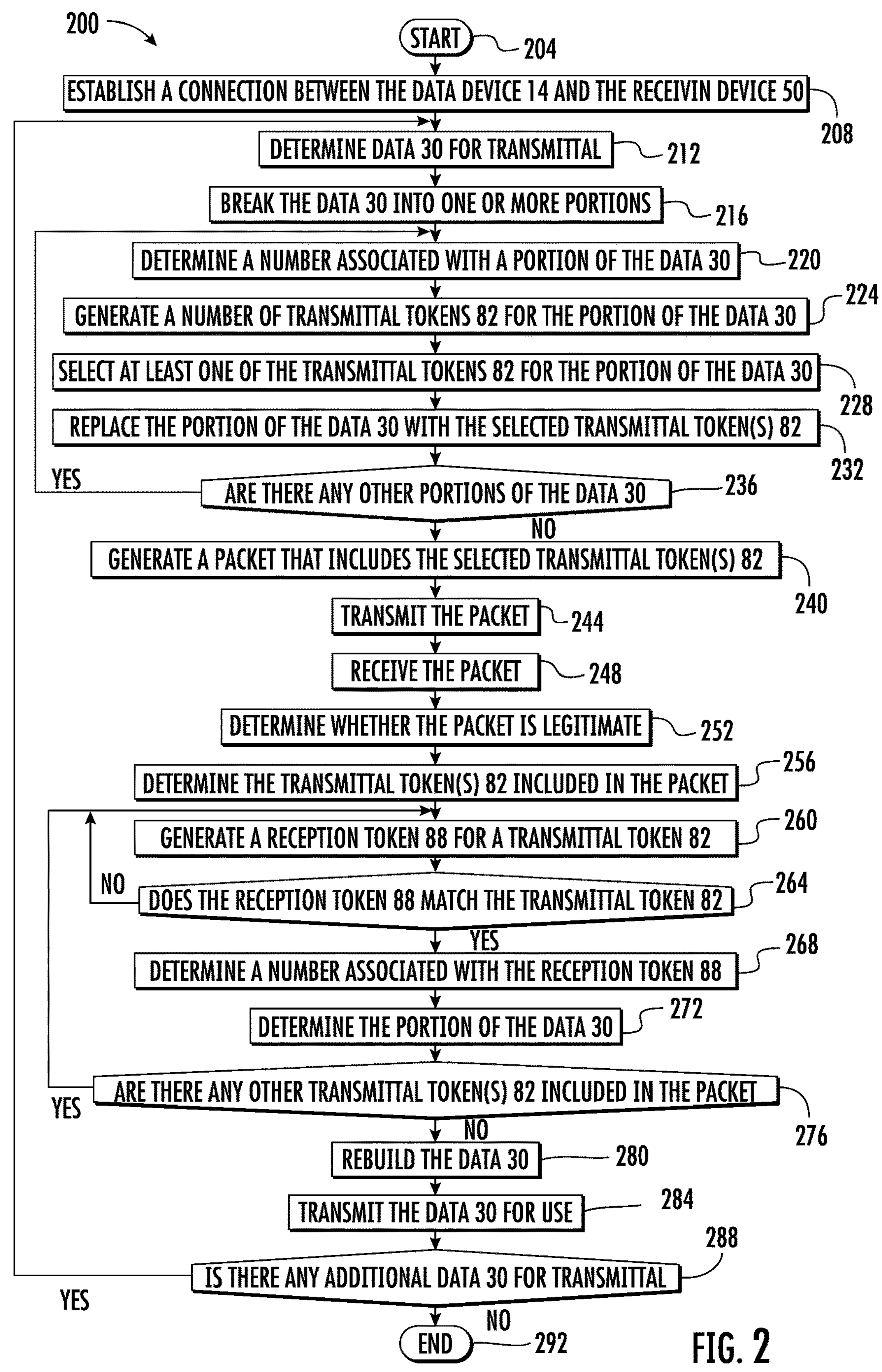
FIG. 2 illustrates an example method for securely transferring data.

Embodiments of the present disclosure are best understood by referring to FIGS. 1-2 of the drawings, like numerals being used for like and corresponding parts of the various drawings.

Typically, a device may transmit data to another device in an unsecured manner. This, however, may be problematic, as an unauthorized entity (e.g., a hacker) may be able to listen to, capture, or otherwise access the transmitted data. Furthermore, even when the device transmits that data using traditional security measures, an unauthorized entity may still be able to access the data. For example, some data may be sent via SSL protocol, which may be susceptible to hacking. As another example, some data may be encrypted using one or more encryption keys prior to the data being sent. These encryption keys, however, are typically stored at the first device (i.e., the device sending the data) and/or the second device (i.e., the device receiving the data). As such, an unauthorized entity may hack one or more of these devices in order to obtain the encryption keys, thereby gaining access to the transmitted data.

Contrary to this, the system 10 of FIGS. 1A-1B may address one or more of these deficiencies. FIGS. 1A-1B illustrate an example system 10 for securely transferring data 30. In one example of operation, system 10 includes a data device 14 (e.g., a garage door remote) that determines data 30 (e.g., an instruction for the garage door to open) for transmittal to a receiving device 50 (e.g., a garage door opener). When the data device 14 is preparing to transmit the data 30 to the receiving device 50, the data device 14 determines a transmittal token 82 (e.g., a set of characters and/or bytes, such as "/AtHM4b#") for each of one or more portions of the data 30, and then replaces each of the portions of the data 30 with the transmittal token 82. Then, the data device 14 transmits the transmittal tokens 82 to the receiving device 50. The actual data 30, however, is not sent to the receiving device 50.

Following reception of the transmittal tokens 82, the receiving device 50 matches each of the transmittal tokens 82 (e.g., "/AtHM4b#") to a reception token 88 (e.g., "/AtHM4b#"). Based on these matches, the receiving device 50 determines (e.g., rebuilds) the data 30 (e.g., the instruction for the garage door to open). This allows the receiving device 50 to determine and utilize the data 30 without the data 30 being actually transmitted from the data device 14 to the receiving device 50, in some examples. Instead, transmittal tokens 82 are sent to the receiving device 50 (instead of the data 30). This prevents an unauthorized entity from listening, capturing, or otherwise accessing the data 30 during transmittal, in some examples.

In the example illustrated in FIGS. 1A-1B, the system 10 includes the data device 14. The data device 14 may be any device that receives data, stores data, and/or transmits data (e.g., data 30). In some examples, the data device 14 may be (or may include) a resource constrained device (e.g. a resource constrained Internet of Things (IoT) device) and/or a device with limited storage capabilities (e.g., limited random access memory (RAM)). For example, the data device 14 may be a microcontroller, a sensor (e.g., a sensor for detecting temperature), a keyfob, a remote control (e.g., a garage door remote control), any device that receives data, stores data, and/or transmits data but that is also resource constrained and/or has limited storage capabilities, or any combination of the preceding.

In other examples, the data device 14 may be any other device that receives data, stores data, and/or transmits data. For example, the data device 14 may be (or may include) a personal computer, a laptop, a mobile telephone (such as a Smartphone), an electronic notebook, a personal digital assistant, a host computer, a workstation, a web server, a network server, any suitable remote server, a mainframe, a file server, any other computing or processing device, any other device for receiving data, storing data, and/or transmitting data, or any combination of the preceding. The functions of the data device 14 may be performed by any suitable combination of one or more servers or other components at one or more locations. In an example where the data device 14 is a server, the server may be a private server, and the server may be a virtual or physical server. The server may include one or more servers at the same or remote locations. Also, the data device 14 may be (or may include) any suitable component that functions as a server.

In the example illustrated in FIGS. 1A-1B, the data device 14 is a garage door remote controller. Furthermore, in the example illustrated in FIG. 1B, the data device 14 includes a computer/data processor 18 and data storage medium 22 (e.g., memory) comprising instructions 26 executable by the processor 18 to perform the functions of the data device 14. Additionally, the data device 14 includes a communication port 46 (e.g., receiver, transmitter, transceiver, network interface) configured to receive and transmit information (e.g., receive requests for data, transmit data). Further example details of data device 14 and/or its components are discussed below.

As is discussed above, the data device 14 may be any device that receives data, stores data, and/or transmits data. This data refers to data 30, in some examples. Data 30 represents any type of information. For example, the data may be an instruction (e.g., open, close, move forward, move backward, etc.). As another example, the data may be information associated with the device or with the user of the device (e.g., key fob information that can be used to open a car, etc.). As a further example, the data may be sensed or measured information (e.g., temperature information sensed or determined by the data device 14).

In other examples, the data 30 may be any other type of information. For example, data 30 may be personal information (e.g., a social security number, membership identifier, name, address), business information (e.g., a document, spreadsheet, or other information created, used, and/or received by a business), medical information (e.g., a medical report, a medical diagnosis, a medical bill), financial information (e.g., information regarding investments, credit card information, bank information, account number), security information (e.g., a password, personal access number), a document (e.g., a word document, an excel spreadsheet, a pdf), an audio file (e.g., a music file), a video file (e.g., a movie file, a tv show file, a video clip), account information, a completed voting ballot (e.g., for voting in an election for public office), any other type of information, or any combination of the preceding.

Data 30 further represents any portion of information. For example, data 30 may be an entire spreadsheet (or other document, such as a word document), or it may be a portion of an entire spreadsheet (or other document), such as only social security numbers or other personal information included in the spreadsheet (or other document). As another example, data 30 may be an entire medical report, or it may be a portion of the medical report, such as only personal information included in the medical report and/or the diagnosis in the medical report.

Data 30 may be information programmed (or pre-programmed) into (or otherwise stored) in the data device 14, in some examples. For example, data 30 may be instructions that are programmed into a garage door remote, or any other data device 14. Data 30 may be input by a user into the data device 14, in some examples. For example, data 30 may be account information input by a user into the data device 14 (e.g., input into a web browser on the data device 14, input into an "app", such as a mobile application, executed by the data device 14), or selected by a user from a selection displayed on the data device 14.

As is discussed above, when the data device 14 is preparing to transmit the data 30 to the receiving device 50, the data device 14 may (1) break the data 30 into one or more portions of the data 30; (2) determine one or more transmittal tokens 82 (e.g., a set of characters and/or bytes, such as "/AtHM4b#" or the binary representation thereof) for each of the portions of the data 30, (3) replace each of the portions of the data 30 with one or more of the transmittal token 82, and (4) send the transmittal tokens 82 to the receiving device (instead of the data 30). Examples of this are discussed below with regard to FIG. 2.

A transmittal token 82 is a set of data that is used to replace one or more portions of data 30, in some examples. The transmittal token 82 may be any type of data. For example, the transmittal token 82 may be a set of numbers, a set of letters (e.g., A, B, C, etc.), a set of numbers and letters, a set of symbols (e.g., %, !, ?, etc.), a set of bytes, a code, any other grouping of characters and/or bytes, or any combination of the preceding. The transmittal token 82 may have any length. For example, the transmittal token 82 may an eight byte token (e.g., 8 characters), a sixteen byte token (e.g., 16 characters), a 32 byte token (e.g., 32 characters), a token with a length of 2-32 bytes, or a token with any other length.

Although the transmittal token 82 is a set of data, it does not include any information that would allow the data 30 to be determined by an unauthorized user, in some examples. For example, if the data 30 is the message "165", the 3 transmittal tokens 82 that are sent to the receiving device 50 may be (1) "/AtHM4b#", (2) "q?5;dS)H", and (3) "Bm)zs", or the binary representations thereof. As such, even if an unauthorized user was able to gain access (or steal) one or more of the transmittal tokens 82, the unauthorized user would be unable to determine the data 30 (e.g., the unauthorized user would be unable to determine that the data 30** was the message "165").

The data device 14 may utilize one or more pseudo random bit generators to generate the transmittal tokens 82. A pseudo random bit generator may alternatively be referred to as a Deterministic Random Bit Generator (DRBG). Examples of a pseudo random bit generator (or a DRBG) include ISAAC (Indirection, Shift, Accumulate, Add, and Count), ISAAC-64, Hash DRBG SHA-1, Hash DRBG SHA-256, Hash DRBG SHA-512, Cipher DRBG AES-128, Cipher DRBG AES-192, Cipher DRBG AES-256, any other pseudo random bit generator (or DRBG), or any other system or method for creating deterministically random numbers.

In the illustrated example, the system 10 further includes the receiving device 50. The receiving device 50 may be any device that receives transmittal tokens 82 from data device 14 and/or processes data 30. In some examples, the data device 14 may be a resource constrained device (e.g. a resource constrained Internet of Things (IoT) device), a device with limited storage capabilities (e.g., limited RAM), a device that communicates with a resource constrained device or that communicates with a device with limited storage capabilities, or any combination with the preceding. For example, the receiving device 50 may be (or may include) a microcontroller (or a device that communicates with a microcontroller), a sensor (e.g., a sensor for detecting temperature) (or device that communicates with a sensor), a keyfob reader, a device that communicates with a remote control (e.g., a garage door opener, a remotely controlled device), any device that receives transmittal tokens 82 from data device 14 and/or processes data 30 but that is also resource constrained and/or has limited storage capabilities (or that communicates with a device that is), or any combination of the preceding.

In other examples, the data device 14 may be any other device that receives transmittal tokens 82 from data device 14 and/or processes data 30. For example, the receiving device 50 may be (or may include) a personal computer, a laptop, a mobile telephone (such as a Smartphone), an electronic notebook, a personal digital assistant, a cable box, a networked television (such as a smart television), a smart monitor or smart display device, a smart projector, a host computer, a workstation, a web server, a network server, any suitable remote server, a mainframe, a file server, any other computing or processing device, any other device that receives transmittal tokens 82 from data device 14 and/or processes data 30, or any combination of the preceding.

As is illustrated in FIGS. 1A-1B, the receiving device 50 is a garage door opener that the user is communicating with using the data device 14 (i.e., a remote control in FIGS. 1A-1B). Furthermore, as is also illustrated in FIG. 1B, the receiving device 50 includes a computer/data processor 54 and data storage medium 58 (e.g., memory) comprising instructions 62 executable by the processor 54 to perform the functions of the receiving device 50. Additionally, the receiving device 50 includes a communication port 74 (e.g., receiver, transmitter, transceiver, network interface) configured to receive and transmit information (e.g., receive transmittal tokens 82, transmit requests for data 30). Further example details of receiving device 50 and/or its components are discussed below.

As is discussed above, the receiving device 50 may receive the transmittal tokens 82 from the data device 14. Following reception of the transmittal tokens 82, the receiving device 50 may match each of the transmittal tokens 82 (e.g., "/AtHM4b#", or the binary representation thereof) to a reception token 88 (e.g., "/AtHM4b#"#", or the binary representation thereof). Based on these matches, the receiving device 50 may determine (e.g., rebuild) the data 30. This allows the receiving device 50 to determine and utilize the data 30 without the data 30 being transmitted from the data device 14 to the receiving device 50, in some examples. Examples of this are discussed below with regard to FIG. 2.

A reception token 88 is a set of data that is used to determine one or more portions of data 30, in some examples. The reception token 88 may be any type of data. For example, the reception token 88 may be a set of numbers, a set of letters (e.g., A, B, C, etc.), a set of numbers and letters, a set of symbols (e.g., %, !, ?, etc.), a set of bytes, a code, any other grouping of characters and/or bytes, or any combination of the preceding. The reception token 88 may have any length. For example, the reception token 88 may be an eight byte token (e.g., 8 characters), a sixteen byte token (e.g., 16 characters), a 32 byte token (e.g., 32 characters), a token with a length of 2-32 bytes, or a token with any other length.

Although the reception token 88 is a set of data, it does not include any information that would allow the data 30 to be determined by an unauthorized user, in some examples. For example, if the data 30 is the message "165", the three reception tokens 88 that are used to determine the data 30 may be (1) "/AtHM4b#", or the binary representation thereof, (2) "q?5;dS)H", or the binary representation thereof, and (3) "Bm)zs)", or the binary representation thereof. As such, even if an unauthorized user was able to gain access (or steal) a reception token 88, the unauthorized user would be unable to determine the data 30 (e.g., the unauthorized user would be unable to determine that the data 30** was the message "165").

In the example illustrated in FIGS. 1A-1B, the reception tokens 88 generated at the receiving device 50 match the transmittal tokens 82 generated at the data device 14. For example, a transmittal token 82 may be "/AtHM4b#" (or the binary representation thereof) and the matching reception token 88 may also be "/AtHM4b#" (or the binary representation thereof).

The receiving device 50 may utilize one or more pseudo random bit generators (or DRBGs) to generate the reception token 88. Examples of a pseudo random bit generator include ISAAC, ISAAC-64, Hash DRBG SHA-1, Hash DRBG SHA-256, Hash DRBG SHA-512, Cipher DRBG AES-128, Cipher DRBG AES-192, Cipher DRBG AES-256, any other pseudo random bit generator (or DRBG), or any other system or method for creating deterministically random numbers. The pseudo random bit generator(s) used by the receiving device 50 are the same as the pseudo random bit generator(s) used by the data device 14, in some examples. As such, the data device 14 may generate transmittal tokens 82 using one or more particular pseudo random bit generators, and the receiving device 50 may generate reception tokens 88 using the same one or more particular pseudo random bit generators. Furthermore, both the data device 14 and the receiving device 50 may utilize the same seed value(s) for their same pseudo random bit generator(s). This may result in both the data device 14 and the receiving device 50 dynamically generating matching transmittal tokens 82 and reception tokens 88.

Modifications, additions, or omissions may be made to system 10 without departing from the scope of the disclosure. For example, system 10 may include any number of data devices 14 and/or receiving devices 50 (and/or any number of components, such as processors or memory units illustrated or described in the above devices). Also, any suitable logic may perform the functions of system 10 and the components and/or devices within system 10. Furthermore, one or more components of system 10 may be separated, combined, and/or eliminated.

Furthermore, although data device 14 and receiving device 50 have been described above as being separate devices, in some examples, they may both be integrated into the same device. In such an example, the data device 14 may refer to a first process being performed within a single device (e.g., within a server), and the receiving device 50 may refer to a second process being performed within the same single device (e.g., within the server). This may allow the single device to securely transfer data between two separate processes being performed by the single device. The device (e.g., a server) may utilize a first processor to perform the process of the data device 14, and may further utilize a second processor to perform the process of the receiving device 50. Alternatively, the process of the data device 14 and the process of the receiving device 50 may be performed by the same processor(s) within the single device.

FIG. 2 illustrates an example method for securely transferring data. As is illustrated, method 200 of FIG. 2 illustrates an example of securely transferring data 30 from data device 14 to receiving device 50 of FIGS. 1A-1B. However, the steps of method 200 may be utilized to securely transfer data 30 (or any other data) from any device to any other device.

Method 200 beings at step 204. At step 208, a connection is established between the data device 14 and the receiving device 50. The connection refers to any type of connection that allows the data device 14 to communicate with the receiving device 50 (and vice versa) so as to transfer data 30, in some examples.

The connection process between the data device 14 and the receiving device 50 may include a pairing process. The pairing process may be any process that synchronizes the receiving device 50 with the data device 14. For example, the pairing process may involve sending one or more messages between the receiving device 50 and the data device 14 in order to synchronize the receiving device 50 with the data device 14. Such synchronization may include checking or verifying that both the receiving device 50 and the data device 14 have one or more of the same pseudo random bit generators, synchronizing the pseudo random bit generators, any other manner of synchronizing the receiving device 50 with the data device 14, or any combination of the preceding. In some examples, the pairing process may not be performed during the connection process. For example, the receiving device 50 and the data device 14 may have been previously paired (e.g., at the factory or in any other secure method or system) and may not need to be paired again. If the receiving device 50 or the data device 14 is missing information used for synchronization (e.g., the receiving device 50 does not have the same pseudo random bit generator(s)), the pairing process may, in some examples, cause the receiving device 50 or the data device 14 to generate the missing information, download the information, otherwise retrieve the missing information, or any combination of the preceding.

The pairing process may further include a synchronization of the pseudo random bit generator(s) included in the data device 14 and the receiving device 50, in some examples. This synchronization of the pseudo random bit generator(s) allows the data device 14 and receiving device 50 to generate matching transmittal tokens 82 and reception tokens 88, in some examples. The synchronization of the pseudo random bit generator(s) may occur in any manner. For example, to synchronize the pseudo random bit generator(s), the data device 14 and the receiving device 50 may both generate, determine, and/or receive one or more seed values (e.g., one seed value, three seed values) that may be input into the pseudo random bit generator(s). These same seed value(s) may synchronize the pseudo random bit generator(s), causing them to independently generate matching transmittal tokens 82 and reception tokens 88. After this initial synchronization (i.e., initialization process or re-initialization process), information transferred (e.g., transmittal tokens 82) during communication between the data device 14 and the receiving device 50 may be used to keep the pseudo random bit generator(s) synchronized, in some examples.

At step 212, the data device 14 determines data 30 for transmittal to the receiving device 50. The data device 14 may determine data 30 in any manner. For example, the data device 14 may determine the data 30 based on an input from a user (or any other entity). As an example of this, the data device 14 may be a garage door remote control. When the user presses a particular button (e.g., the open button) on the garage door remote control, the garage door remote control may determine that an instruction associated with that particular button (e.g., the open instruction) is to be transmitted to the receiving device 50 (e.g., so as to cause the garage door to open). As another example, the data device 14 may determine the data 30 based a measurement (or other input). As an example of this, when a sensor measures a temperature, this measured temperature may be provided to the data device 14, which may then determine that this measured temperature is to be transmitted to the receiving device 50.

As a further example, the data device 14 may determine the data 30 when it is input by a user (or any other entity). As an example of this, the user may input their social security number into a fillable graphical box displayed on the display screen of the data device 14 (or the social security number may be auto filled by a program running on the data device 14), and then the user may activate a button that authorizes the transmittal of the input social security number. When the user activates this button, the data device 14 may determine that this social security number is data 30 that is to be transmitted to the receiving device 50. As another example, the data device 14 may determine the data 30 when it is selected by a user (or any other entity). As an example of this, the user may select a file and/or document from storage (e.g., a word document stored on the data device 14 or accessible to the data device 14), and then the user may activate a button that authorizes the transmittal of the file and/or document. When the user activates this button, the data device 14 may determine that this file and/or document is data 30 that is to be transmitted to the receiving device 50. As another example of this, the user may select an option (e.g., one option from a list of different options) displayed on the display screen of the data device 14, and then the user may activate a button that authorizes the transmittal of the selected option. When the user activates this button, the data device 14 may determine that this selected option is data 30 that is to be transmitted to the receiving device 50. In other examples, the determination of the data 30 may not require user input at all. For example, the transmittal of data 30 may be an automated communication between two end points. In such an example, the determination of the data 30 may occur when the data 30 is selected (or otherwise input) by one of the end points.

At step 216, the data device 14 breaks the data 30 into one or more portions. The data device 14 may break the data 30 into portions in any manner, and the data device 14 may break the data 30 into any number of portions. For example, the data device 14 may break the data 30 into individual bytes of data. In computer technology, a byte contains 8 bits, and each of these bits can be either a 0 or a 1. This means that a byte can have a binary value from 00000000 to 11111111, and any combination between. There are 256 different combinations between 00000000 to 11111111. As such, there are 256 different possible values of a byte, and each of these values is referred to as a number from 0-255 (for a total of 256). Furthermore, in accordance with American Standard Code for Information Interchange (ASCII) mapping, each of the 256 bytes represents a particular character, symbol, or instruction when the byte is encoded in the English language. For example, the binary value 00110001 has a ASCII byte value of 49, and it represents the number “1” when encoded in the English language.

As one example of the data device 14 breaking the data 30 into individual bytes of data, if the data 30 is the number “165” (where 165 represents the temperature of 165° F., for example), the data 30 may be broken up into 3 bytes of data: (1) the binary representation of “1” (i.e., 00110001), (2) the binary representation of “6” (i.e., 00110110), and (3) the binary representation of “5” (i.e., 00110101). As another example of this, if the data 30 is a social security number, the data 30 may be broken up into 8 bytes of data, with one byte for each number in the social security number. In a further example, if the data 30 is the instruction “1” (where “1” represents the command to open a garage door), the data 30 may only be broken up into 1 byte: the binary representation of “1” (i.e., 00110001). In other examples, the data device 14 may break the data 30 into any other type of (or size) portion.

Following step 216, the method 200 moves to steps 220-232. As is discussed below, steps 220-232 may be performed for each portion of the data 30. For example, if the data 30 is the number “165” (where “165” is broken into three portions), each of steps 220-232 may be performed three times: (1) once for the binary representation of “1” (i.e., 00110001), (2) once for the binary representation of “6” (i.e., 00110110), and (3) once for the binary representation of “5” (i.e., 00110101).

At step 220, the data device 14 determines a number associated with the portion of the data 30. The data device 14 may determine the number in any manner. As one example, the data device 14 may determine the number based on ASCII mapping. For example, according to ASCII mapping, the binary representation of “1” (i.e., 00110001) has an ASCII byte value of 49. In such an example, if the portion of the data 30 is the binary representation of “1” (i.e., 00110001), the data device 14 may determine that the number 49 (i.e., the ASCII byte value) is to be associated with that portion of the data. In another example of this, if the first portion of the data 30 is the binary representation of “1” (i.e., 00110001), the data device 14 may determine that the number 50 (i.e., the ASCII byte value plus 1) is to be associated with that portion of the data. The number 50 may be used instead of 49 because ASCII byte values start with zero, which means that the ASCII byte value of 49 actually refers to the $50^{th}$ byte value (not the $49^{th}$).

Although the determined number is described above as being based on ASCII mapping, in other examples, any other number may be determined. For example, if the data device 14 only transmits messages with characters from 1-9, the determined number for the binary representation of “1” (i.e., 00110001) may be 1, the determined number for the binary representation of “2” (i.e., 00110010) may be 2, and so on all the way to where the determined number for the binary representation of “9” (i.e., 00111001) may be 9.

At step 224, the data device 14 generates a number of transmittal tokens 82 for the portion of the data 30. The data device 14 may generate the number of transmittal tokens 82 in any manner. For example, the data device 14 may generate the transmittal tokens 82 using the pseudo random bit generator(s), discussed above.

The number of transmittal tokens 82 generated at step 224 may be any number. In some examples, the number of transmittal tokens 82 generated at step 224 is based on the determined number associated with the portion of the data 30 (as is discussed above in step 220). The number of transmittal tokens 82 generated at step 224 may be based in any way on the determined number associated with the portion of the data 30. As one example, the number of transmittal tokens 82 generated at step 224 may be equal to the determined number associated with the portion of the data 30. As an example of this, if the first portion of the data 30 is the binary representation of “1” (i.e., 00110001), the determined number for that first portion of the data 30 may be 50 (according to ASCII mapping, as is discussed above). In such an example, the number of transmittal tokens 82 generated at step 224 may also be 50. That is, in such an example, at step 224, 50 transmittal tokens 82 are generated for the portion of the data 30

In other examples, the number of transmittal tokens 82 generated at step 224 may be based on the determined number associated with the portion of the data 30 in any other way. For example, the number of transmittal tokens 82 may be a particular multiple of the determined number (e.g., two times the determined number), a particular addition or subtraction equation that is based on the determined number (e.g., the determined number+2, the determined number−3), any other way of being based on the determined number associated with the portion of the data 30, or any combination of the preceding.

Although the transmittal tokens 82 are described above as being generated, in some examples, the transmittal tokens 82 may be determined. The transmittal tokens 82 may be determined by being generated (as is discussed above) by the data device 14. Alternatively, the transmittal tokens 82 may be determined in any other manner. For example, the transmittal tokens 82 may be determined by selecting the transmittal tokens 82 from a group of stored transmittal tokens 82. As an example, the data device 14 may have thousands (or millions, or any other number) of possible transmittal tokens stored on disk or accessible to the data device 14 (e.g., stored on a memory unit that the data device 14 has access to). In such an example, the data device 14 may determine a particular transmittal token 82 by selecting it from these thousands (or millions, or any other number) of possible transmittal tokens. This selection of the transmittal tokens 82 may be performed in any manner (e.g., the selection may be pseudo random using the pseudo random bit generator). Furthermore, because the data device 14 may store thousands (or millions, or any other number) of the possible transmittal tokens, the vast number of possible transmittal tokens may prevent an unauthorized entity from determining which transmittal tokens 82 were used, even if the unauthorized entity were to gain access to the data device 14.

The transmittal tokens 82 may be generated in real time (e.g., generated only when it is needed for a secure transfer of data 30). This may prevent transmittal tokens 82 from having to be stored on disk. Instead, the transmittal tokens 82 may only be stored in transient memory, as opposed to being stored on disk. Furthermore, once the transmittal tokens 82 are transmitted (to the receiving device 50), the transmittal tokens 82 may be deleted (e.g., deleted from transient memory) or otherwise destroyed. As such, the transmittal tokens 82 may be one-time use tokens that are deleted or is destroyed after their use. This may prevent the transmittal tokens 82 from being compromised if an unauthorized entity were to access the data device 14.

At step 228, the data device 14 selects at least one of the transmittal tokens 82 for the portion of the data 30. The data device 14 may select any of the transmittal tokens 82 for the portion of the data 30. For example, the data device 14 may select that last generated transmittal token 82 for the portion of the data 30. As an example of this, if 50 transmittal tokens 82 were generated at step 228 (based on the ASCII mapping associated with the binary representation of "1"), the $50^{th}$ generated transmittal token 82 (i.e., the last generated transmittal token 82) may be selected for the portion of the data 30. The other non-selected transmittal tokens 82 may not be used and/or may be discarded or otherwise deleted or destroyed.

In other examples, any other of the transmittal tokens 82 may be selected for the portion of the data 30. For example, the first generated transmittal token 82 may be selected, the second generated transmittal token 82 may be selected, the second to last generated transmittal token 82 may be selected, or any other generated transmittal token 82 by selected.

Any number of transmittal tokens 82 may be selected for the portion of the data 30. For example, only a single transmittal token 82 may be selected (e.g., the last generated transmittal token 82), two transmittal tokens 82 may be selected (e.g., the last generated transmittal token 82 and the second to last transmittal token 82), all of the transmittal tokens 82 may be selected, or any other number of the transmittal tokens 82 may be selected.

At step 232, the data device 14 replaces the portion of the data 30 with the selected transmittal token(s) 82. The data device 14 may replace the portions of the data 30 with transmittal tokens 82 in any manner. As one example, if the first portion of the data 30 is the binary representation of "1" (i.e., 00110001), then this binary representation of "1" (i.e., 00110001) may be replaced with the selected transmittal token 82 of "/AtHM4b#" (or the binary representation thereof). As such, the selected transmittal token 82 "/AtHM4b#" (or the binary representation thereof) may be sent, not the binary representation of "1" (i.e., 00110001), in some examples.

At step 236, the data device 14 determines if there are any other portions of the data 30. If there are no more portions of the data 30, then the method moves to step 240. However, if there are additional portion(s) of the data 30, the method 200 may move back to step 220, so that steps 220-232 may be repeated for each of the portions of the data 30.

At step 240, the data device 14 generates a packet that includes the selected transmittal tokens 82. The packet may be generated in any manner. In some examples, the packet may also include additional information (other than the transmittal tokens 82). For example, the packet may include an identifier (e.g., a header, trailer, etc.). The identifier of the packet may include an identification code (which may identify the packet as having been sent by the data device 14), a timestamp (which may identify the time and/or date the packet was created and/or transmitted by the data device 14, such as in a yyyy.dd.HH.mm.sss format or any other format and at any time resolution), a parsing format identifier (which may identify how the packet was formed and how the data can be de-parsed), a sequence number that may help to identify and recover from the event of a dropped packet or out of order packets within the communication between two devices, any other data, or any combination of the preceding.

Following generation of the packet, the data device 14 transmits the packet at step 244. The data device 14 may transmit the packet to the receiving device 50. The data device 14 may transmit the packet in any manner and over any communications network. For example, the data device 14 may transmit the packet over the Internet (e.g., using a Transmission Control Protocol (TCP) communications protocol, using a Hypertext Transfer Protocol (HTTP) communications protocol), a WI-FI network, a cellular network, a radio telecommunication network, a BLUETOOTH network, a near-field communication (NFC) network, any other wireless network, any wired network (e.g., a Public Switched Telephone Network (PSTN)), any other manner of transmission, or any combination of the preceding. Furthermore, the packet may be transmitted in a single transmission, in some examples.

At step 248, the receiving device 50 receives the packet. After receiving the packet, the receiving device 50 determines whether the packet is legitimate at step 252. The receiving device 50 may determine whether the packet is legitimate in any manner. As an example, the receiving device 50 may analyze the identifier of the packet to determine whether or not the identifier of the packet includes an identification code that identifies the packet as having been sent by the data device 14. In some examples, if the packet is determined to not be legitimate, the packet may be disregarded by the receiving device 50. In some examples, determining whether the packet is legitimate may include decrypting or decoding one or more portions of the packet (e.g., the header of the packet). In some examples, the receiving device 50 may determine whether the packet is legitimate by passing the packet to a library or application installed or accessible to the receiving device 50. In such an example, the library or application may determine whether packet is legitimate.

In some examples, determining whether the packet is legitimate includes determining whether the packet was received within a predetermined amount of time. For example, the receiving device 50 may analyze the packet to determine whether or not the packet includes a timestamp that is within a predetermined timestamp threshold. As is discussed above, the timestamp may identify the time and/or date the packet was created and/or transmitted by the data device 14. As such, the receiving device 50 may include a predetermined timestamp threshold that may allow the receiving device 50 to determine whether the packet is too late or too early. The predetermined timestamp threshold may be any amount of time. For example, the predetermined timestamp threshold may by 1 millisecond, 2 milliseconds, 3 milliseconds, 5 milliseconds, 10 milliseconds, 1 second, any negative amount of time (e.g., −1 millisecond), or any other amount of time. The receiving device 50 may compare the time on the timestamp to the time at which the receiving device 50 received the packet. If the lapse in time is greater than the predetermined timestamp threshold, the receiving device 50 determines that the packet is not legitimate, and discards the packet, in some examples. This may prevent the receiving device 50 from acting on a packet that has taken too long to reach the receiving device 50 (or that reached the receiving device 50 too early), as the delay may indicate that the packet was intercepted and/or delayed by an unauthorized entity, in some examples.

At step 256, the receiving device 50 determines the transmittal tokens 82 included in the received packet. The receiving device 50 may determine the transmittal tokens 82 in any manner. For example, the receiving device 50 may de-parse the packet to determine the transmittal tokens 82.

De-parsing the packet may refer to breaking up the data in the packet into potential tokens, or otherwise identifying potential tokens. For example, the data in the packet (other than the header, for example) may include the following string of characters: "/AtHM4b#q?5;dS)HBm)zs", or the binary representations thereof. In such an example, de-parsing this packet may identify three potential tokens: (1) "/AtHM4b#", (2) "q?5;dS)H", and (3) "Bm)zs", or the binary representations thereof. The receiving device 50 may de-parse the packet in any manner. In some examples, the receiving device 50 may include one or more parsing methods that may allow the receiving device 50 to de-parse the packet into potential tokens. For example, a parsing method may provide a format and/or length of each token (e.g., one token is 8 characters of the data, one token is 32 characters of the data, one token has the format xxxx-XXX-xxxx-xxxxxxxxx, one token has the characters "A" and "X" as the first and fourth characters), allowing the receiving device 50 to de-parse the packet based on the format and/or length of the tokens. As another example, a parsing method may provide a character pattern in-between tokens (e.g., fake characters that indicate a token, such as the first 2 characters are fake and the last 3 characters are fake). In the example included above, the parsing method indicates that each potential token has 8 characters of the data.

The parsing method used to de-parse the packet may always be the same. On the other hand, the parsing method used to de-parse the packet may differ. For example, both the data device 14 and the receiving device 50 may include more than one parsing method (e.g., 3 parsing methods, 5 parsing methods) to choose from in forming the packet and de-parsing the packet. In such an example, the receiving device 50 may use the same parsing method to de-parse the packet as the data device 14 used to form the packet. Furthermore, in such an example, the data device 14 may form the packet using a particular parsing method, and may further add an identifier of that parsing method into the header of the packet (e.g., the parsing format identifier discussed above). The receiving device 50 may use this parsing format identifier to determine which parsing method to use, and may then use that parsing method to de-parse the packet.

Following step 256, the method 200 moves to steps 260-272. As is discussed below, steps 260-272 may be performed for each determined transmittal token 82 included in the received packet. For example, as is discussed above, the received packet may include the following three determined transmittal tokens 82: (1) "/AtHM4b#", (2) "q?5;dS)H", and (3) "Bm)zs". In such an example, each of steps 260-272 may be performed three times: (1) once for "/AtHM4b#", (2) once for "q?5;dS)H", and (3) once for "Bm)zs".

At step 260, the receiving device 50 generates a reception token 88. The receiving device 50 may generate the reception token 88 in any manner. For example, the receiving device 50 may generate the reception token 88 using the pseudo random bit generator(s), discussed above. The receiving device 50 may generate the reception token 88 using the same pseudo random bit generator(s) as did the data device 14. In such examples, the reception tokens 88 and the transmittal tokens 82 may be the same (or may be otherwise matching).

Although the reception token 88 is described above as being generated, in some examples, the reception token 88 may be determined. The reception token 88 may be determined by being generated (as is discussed above) by the receiving device 50. Alternatively, the reception token 88 may be determined in any other manner. For example, the reception token 88 may be determined by selecting the reception token 88 from a group of stored reception tokens 88. As an example, the receiving device 50 may have thousands (or millions, or any other number) of possible reception tokens stored on disk or accessible to the receiving device 50 (e.g., stored on a memory unit that the receiving device 50 has access to). In such an example, the receiving device 50 may determine a particular reception token 88 by selecting it from these thousands (or millions, or any other number) of possible reception tokens. This selection of the reception tokens 88 may be performed in any manner (e.g., the selection may be pseudo random). Furthermore, because the receiving device 50 may store thousands (or millions, or any other number) of the possible reception tokens, the vast number of possible reception tokens may prevent an unauthorized entity from determining which reception tokens 88 were used, even if the unauthorized entity were to gain access to the receiving device 50.

The reception token 88 may be generated in real time (e.g., generated only when it is needed for a secure transfer of data 30). This may prevent reception token 88 from having to be stored on disk. Instead, the reception token 88 may only be stored in transient memory, as opposed to being stored on disk. Furthermore, once the reception token 88 is utilized to determine (e.g., rebuild) the data 30, the reception token 88 may be deleted (e.g., deleted from transient memory) or otherwise destroyed. As such, the reception token 88 may be a one-time use token that is deleted or otherwise destroyed after its use. This may prevent the reception token 88 from being compromised if an unauthorized entity were to access the receiving device 50.

At step 264, the receiving device 50 determines whether the generated reception token 88 matches a determined transmittal token 82. If the generated reception token 88 matches the determined transmittal token 82, the method 200 may move to step 268. However, if it does not match the determined transmittal token 82, the method 200 may move back to step 260, where another reception token 88 is generated. This cycle may continue to repeat until the generated reception token 88 matches the determined transmittal token 82.

The receiving device 50 may match a reception token 88 to a transmittal token 82 in any manner. For example, the receiving device 50 may compare the reception token 88 to the transmittal token 82 in order to determine if there is a match. The reception token 88 may match a transmittal token 82 if the two tokens are identical (e.g., "/AtHM4b#" and "/AtHM4b#"). As another example, the reception token 88 may match a transmittal token 82 if the reception token 88 includes at least all of the characters of the transmittal token 82 (or vice versa) (e.g., "/AtHM4b#" and "/AtHM4b#L7&2@"). As further examples, the reception token 88 may match a transmittal token 82 if the two tokens are opposite (e.g., "up" and "down"), if the two tokens complement or complete each other (e.g., "12345" and "6789"), if one token asks a question and the other token correctly answers it, any other manner of matching, or any combination of the preceding.

At step 268, the receiving device 50 determines a number associated with the generated (and matching) reception token 88. The receiving device 50 may determine the number in any manner. As one example, the receiving device 50 may determine the number based on the number of attempts it took to generate a reception token 88 (e.g., the number of times that step 260 was performed) that matches the determined transmittal token 82. As an example of this, if it took 50 attempts to generate a reception token 88 that matches the determined transmittal token 82, the number may be determined to be 50. In some examples, the number may be determined using a counter that increases by one each time step 260 is performed.

At step 272, the receiving device 50 determines the portion of the data 30 based on the determined number from step 268. The receiving device 50 may determine the number in any manner. As one example, the receiving device 50 may determine the number based on ASCII mapping. For example, per ASCII mapping (e.g., the ASCII byte value plus 1), the number 50 may be associated with the binary representation of "1" (i.e., 00110001). In such an example, if the determined number (at step 268) is 50, the portion of the data 30 may be determined to be the binary representation of "1" (i.e., 00110001). In some examples, the step of determining the portion of the data 30 based on the determined number from step 268 may be the reverse of step 220 (above).

In other examples, the step of determining the portion of the data 30 based on the determined number from step 268 may be the reverse of steps 220 and 224 (above). For example, as is discussed above in step 224, the number of transmittal tokens 82 that are generated may be, for example, a particular multiple of the determined number from step 220 (e.g., two times the determined number), or a particular addition or subtraction equation that is based on the determined number from step 220 (e.g., the determined number+2, the determined number−3). In such an example, the determining done at step 272 may be based on an opposite multiple of the determined number from step 268 (e.g., half the determined number) or an opposite addition or subtraction equation (e.g., the determined number−2, the determined number+3). This may compensate for changes made at step 220, in some examples. As one example of this, the determined number associated with the binary representation of "1" (i.e., 00110001) may typically be 50. However, at the data device 14, the determined number (at step 220) may be twice this, for a total of 100. This means that, at the data device 14, 100 transmittal tokens 82 may be generated. In such an example, the receiving device may compensate for this. For example, if it takes 100 attempts to find a matching reception token 88, the determined number (at step 268) may be determined to be half this 100 amount, for a total of 50. Then the receiving device 50 may determine (at step 272) that this number 50 refers (via ASCII mapping) to the binary representation of "1" (i.e., 00110001).

At step 276, the receiving device 50 determines if there are any other determined transmittal tokens 82 included in the received packet. If there are no more transmittal tokens 82, then the method 200 moves to step 280. However, if there are additional transmittal tokens 82, the method 200 may move back to step 260, so that steps 260-272 may be repeated for each of the determined transmittal tokens 82 included in the received packet.

At step 280, the receiving device 50 rebuilds the data 30 based on the determined portions of the data 30. The receiving device 50 may rebuild the data 30 in any manner. For example, the receiving device 50 may combine all of the determined portions of the data 30 (in the order in which they were determined, in some examples), so as to rebuild the data 30. As an example of this, if the determined portions of the data 30 are (1) the binary representation of "1" (i.e., 00110001), (2) the binary representation of "6" (i.e., 00110110), and (3) the binary representation of "5" (i.e., 00110101), these determined portions of the data 30 may be combined into the binary representation of "165" (i.e., 001100010011011000110101).

At step 284, the receiving device 50 transmits the data 30 for use. In some examples, the receiving device 50 may transmit the data 30 for use by the receiving device 50. For example, the data 30 may be transmitted to an application or other program that is being executed by the processor of the receiving device 50. This may allow the application or other program to use or otherwise access the data 30. For example, if the data 30 is an instruction to open a garage door, the receiving device 50 (e.g., a garage door opener) may utilize the data 30 to open the garage door. As another example, if the data 30 is an instruction to move (e.g., forward, backward), the receiving device 50 (e.g., a remote-controlled drone, a remote-controlled robot) may utilize the data 30 to move. In other examples, the receiving device 50 may transmit the data 30 (e.g., a sensed temperature, such as 165° F.) to the user of the receiving device 50. In such an example, the transmission of the data 30 may refer to a transmission that causes the data 30 to be displayed on a display screen (e.g., displayed on a display screen of a Smartphone), and/or a transmission that causes the data 30 to be output to another user interface (e.g., output as sound from speakers or earphones of a mobile device). As such, the user may view, listen to, or otherwise access the data 30. In additional examples, the receiving device 50 may transmit the data 30 to another device (e.g., a server that will store the data 30, a television that will display the data 30). In other examples, the transmission of the data 30 may refer to any other manner in which the receiving device 50 may utilize the data 30. For example, the transmission of the data 30 may refer to the receiving device 50 storing the data 30 in memory (e.g., storage on disk).

At step 288, the data device 14 determines whether to transmit additional data 30 (using transmittal tokens 82, as is discussed above). The data device 14 may determine whether to transmit additional data 30 for any reason. For example, a user of data device 14 may have selected to have additional data 30 transmitted. As another example, an application, program, and/or device on data device 14 may have provided additional data 30 to the data device 14 for transmittal. As a further example, the data device 14 may have received a request from the receiving device 50 for additional data 30.

If it is determined at step 288 that additional data 30 should not be transmitted, the method 200 moves to step 292, where the method 200 ends. On the other hand, if it is determined that additional data 30 should be transmitted, the method 200 moves back up to step 212, where the data device 14 determines the additional data 30. Then the method 200 re-performs one or more (or all) of steps 212-284 so as to securely transfer the additional data 30 (using transmittal tokens 82, as is discussed above). The steps 212-284 may be re-performed any number of times, so as to securely transfer any amount of data.

As one example of portions of method 200 in operation, a data device 14 may intend to transmit the number "165" (where 165 represents the temperature of 165° F., for example) to the receiving device 50. To do so, the data 30 may be broken up into 3 bytes of data: (1) the binary representation of "1" (i.e., 00110001), (2) the binary representation of "6" (i.e., 00110110), and (3) the binary representation of "5" (i.e., 00110101). For each of these 3 bytes of data, the data device 14 may utilize one or more pseudo random bit generators to generate transmittal token(s) 82 to replace the byte of data. For the binary representation of "1" (i.e., 00110001), the data device 14 may utilize one or more pseudo random bit generators to generate 50 different transmittal token(s) 82 (where 50 is the relevant ASCII byte value+1), and may then replace the binary representation of "1" with the $50^{th}$ generated transmittal token 82 (e.g., the token "/AtHM4b#", or the binary representation thereof). For the binary representation of "6" (i.e., 00110110), the data device 14 may utilize one or more pseudo random bit generators to generate 55 different transmittal token(s) 82 (where 55 is the relevant ASCII byte value+1), and may then replace the binary representation of "6" with the $55^{th}$ generated transmittal token 82 (e.g., the token "q?5;dS)H", or the binary representation thereof). For the binary representation of "5" (i.e., 00110101), the data device 14 may utilize one or more pseudo random bit generators to generate 55 different transmittal token(s) 82 (where 54 is the relevant ASCII byte value+1), and may then replace the binary representation of "5" with the $54^{th}$ generated transmittal token 82 (e.g., the token "Bm)zs", or the binary representation thereof). The data device 14 may then combine these replacement transmittal tokens 82 (e.g., where the combination may be "/AtHM4b#q?5;dS)HBm)zs", or the binary representations thereof) into a packet, and transmit the packet to the receiving device 50

Following reception of the packet, the receiving device 50 may determine that the combination of "/AtHM4b#q?5;dS) HBm)zs" includes three transmittal tokens 82: (1) "/AtHM4b#", (2) "q?5;dS)H", and (3) "Bm)zs", or the binary representations thereof. For each of these 3 transmittal tokens 82, the receiving device 50 may utilize one or more pseudo random bit generators to generate a reception token 88 that matches the transmittal token 82. For example, for each of these 3 potential transmittal tokens 82, the receiving device 50 may utilize one or more pseudo random bit generators to keep generating reception tokens 88 until one of the reception tokens 88 matches the transmittal token 82. For the first transmittal token 82, if the match takes 50 different generated reception tokens 88 (e.g., the cycle is repeated 50 times), then the receiving device 50 can determine that the first transmittal token 82 represents the binary representation of "1". For the second transmittal token 82, if the match takes 55 different generated reception tokens 88 (e.g., the cycle is repeated 55 times), then the receiving device 50 can determine that the second transmittal token 82 represents the binary representation of "6". For the third transmittal token 82, if the match takes 54 different generated reception tokens 88 (e.g., the cycle is repeated 54 times), then the receiving device 50 can determine that the second transmittal token 82 represents the binary representation of "5". The receiving device 50 can then rebuild the data 30 (e.g., combine the binary representation of "1", the binary representation of "6", and the binary representation of "5", into the data "165", or the binary representation thereof). The receiving device 165 may then transmit this data 30 for use.

Modifications, additions, or omissions may be made to method 200. For example, although the steps of method 200 are described above as being performed by data device 14 or receiving device 50, in some examples, one or more of the steps of method 200 may be performed by any other device. As another example, one or more steps of method 200 may be optional, or may not be performed. For example, method 200 may not include step 208, where a connection is established. Instead, communication between the data device 14 and receiving device 50 may begin when the data device 14 starts transmitting data 30. As a further example, the steps of method 200 may be performed in parallel or in any suitable order.

Furthermore, in some examples, system 10 is not limited to only transferring data 30 from the data device 14 to the receiving device 50. For example, the receiving device 50 may perform steps 212-244 to transmit data 30 to data device 14, and the data device 14 may perform steps 248-284 to determine and use this data 30. That is, both devices may utilize the same steps to communicate back and forth between each other.

Additionally, in some examples, the system 10 may re-synchronize the pseudo-random bit generators at any time, so as to generate matching tokens. As one example of this, if the receiving device 50 determines that a message it received was fraudulent, the receiving device 50 may re-start its pseudo-random bit generators to a time frame (or point) directly before the receipt of the fraudulent message. This re-start may re-synchronize the pseudo-random bit generator (s) of the receiving device 50 with the pseudo-random bit generator(s) of the data device 14.

In various examples, the herein described systems (e.g., system 10), devices (e.g., data device 14, receiving device 50), components of the devices, and methods (e.g., method 200) may be implemented in software, firmware, or executable instructions stored in a data storage medium such as or including machine-readable medium. The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. Some examples may be implemented using a machine-readable medium or article which may store an instruction or a set of instructions that, if executed by a machine, may cause the machine to perform a method and/or operations in accordance with the examples. Such a machine may include, for example, any suitable processing platform, computing platform, computing device, processing device, computing system, processing system, computer, processor, or the like, and may be implemented using any suitable combination of hardware and/or software. Computers and computer systems described herein (e.g., data device 14, receiving device 50) may include operatively associated computer-readable memory media such as memory for storing software applications and instructions used in obtaining, processing, storing or communicating data. It can be appreciated that such memory can be internal, external, remote or local with respect to its operatively associated computer or computer system. Memory may also include any manner of storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), or other like computer-readable media. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like.

It will be further apparent to one of ordinary skill in the art that some of the examples as described hereinabove may be implemented in many different examples of instruction (e.g., software or firmware) and hardware. The instructions may include any suitable type of code, such as source code, compiled code, interpreted code, executable code, static code, dynamic code, and the like. The actual software code or specialized control hardware used to implement some of the illustrated examples do not limit the present disclosure. The instructions may be implemented, for example, using any suitable programing language, which may include high-level, low-level, object-oriented, visual, compiled or interpreted programming languages, such as, but not limited to, C, C++, C#, Java, BASIC, SQL, Perl, Matlab, Pascal, Visual BASIC, Go, Python, Java Script, Typescript, Objective C, Swift, assembly language, machine code, and so forth. The examples are not limited in this context.

The methods (e.g., method 200), systems (e.g., system 10), devices (e.g., data device 14, receiving device 50), and components of the devices have been illustrated and described herein as comprising several separate functional elements, such as modules or units. Although certain of such modules or units may be described by way of example, it can be appreciated that a greater or lesser number of modules or units may be used and still fall within the scope of the examples. Further, although various examples may be described in terms of modules or units to facilitate description, such modules or units may be implemented by one or more hardware components (e.g., embedded systems/peripherals, processors, chips, FPGAs, DSPs, PLDs, ASICs, circuits, registers, servers, clients, network switches and routers), software components (e.g., programs, subroutines, logic) and/or combination thereof. It can be appreciated that, in certain aspects, a single component may be replaced by multiple components, and multiple components may be replaced by a single component, to provide an element or structure or to perform a given function or functions. Except where such substitution would not be operative to practice certain examples of the present disclosure, such substitution is considered within the scope of the present disclosure. In one example, all or a portion of the system, its features or functional elements, modules, units, etc. or one or more steps of the method may be associated with, implemented by, executed on, or embedded in (e.g., as embedded software/firmware) one or more hardware components. Further, such one or more components so configured may be installed or associated with one or more devices and therein configured to perform the herein described system functionalities or methods. The modules or units may comprise, or be implemented as, one or more systems, sub-systems, devices, components, circuits, logic, programs, or any combination thereof, as desired for a given set of design or performance constraints. For example, the modules may comprise electronic elements fabricated on a substrate. In various implementations, the electronic elements may be fabricated using silicon-based IC processes such as complementary metal oxide semiconductor (CMOS), bipolar, and bipolar CMOS (BiCMOS) processes, for example. The examples are not limited in this context.

It may be appreciated that terms such as "processing", "generating", "determining", or the like, unless stated otherwise, refer to the action or processes of a computer or computing system, or similar electronic computing device, that manipulates or transforms data represented as physical quantities (e.g., electronic) within the computing system's registers or memories into other data similarly represented as physical quantities within the computing system's memories, registers or other such information storage, transmission or display devices. The examples are not limited in this context. An action such as "identifying" or "matching" when performed by a computer or computer system may include identification by determining, accessing system data, comparisons with system data, instructions, or the like. An action such as initiating may include causing an event or thing initiated either directly or indirectly. For example, initiating may include signaling, providing power or instructions, physical manipulation, transmission of data, calculation of conditions, or other step resulting in the event sought to be initiated. Furthermore, an action such as "storing", when used in reference to a computer or computer system, refers to any suitable type of storing operation including, for example, storing a value to memory, storing a value to cache memory, storing a value to a processor register, and/or storing a value to a non-volatile data storage device.

This specification has been written with reference to various non-limiting and non-exhaustive examples. However, it will be recognized by persons having ordinary skill in the art that various substitutions, modifications, or combinations of any of the disclosed examples (or portions thereof) may be made within the scope of this specification. Thus, it is contemplated and understood that this specification supports additional examples not expressly set forth in this specification. Such examples may be obtained, for example, by combining, modifying, or reorganizing any of the disclosed steps, components, elements, features, aspects, characteristics, limitations, and the like, of the various non-limiting and non-exhaustive examples described in this specification.

What is claimed is:

1. A system, comprising:
- a first computing device comprising:
  - one or more memory units; and
  - one or more processors coupled to the one or more memory units and configured, upon executing one or more instructions, to:
    - determine data for transmittal to a second computing device;
    - break the data into one or more portions;
    - for each of the one or more portions of the data:
      - determine a number associated with the respective portion of the data;
      - pseudo randomly generate a number of transmittal tokens, utilizing a first set of one or more pseudo random bit generators, wherein the number of transmittal tokens that are pseudo randomly generated is based on the number associated with the respective portion of the data;
      - select at least one transmittal token from the number of transmittal tokens that are pseudo randomly generated; and
      - replace the respective portion of the data with the selected at least one transmittal token; and
    - transmit the one or more selected transmittal tokens for receipt by the second computing device;
- wherein the second computing device is configured to:
  - receive the one or more selected transmittal tokens;
  - for each of the one or more received transmittal tokens:
    - pseudo randomly generate one or more reception tokens, utilizing a second set of one or more pseudo random bit generators, until one of the reception tokens of the one or more reception tokens matches the respective received transmittal token, wherein the second set of one or more pseudo random bit generators is synchronized with the first set of one or more pseudo random bit generators; and determine the respective portion of the data based on a number of generated reception tokens;

rebuild the data using the one or more determined portions of the data; and transmit the data for use.

2. The system of claim 1, wherein the data is not transmitted for receipt by the second computing device.

3. The system of claim 1, wherein each of the one or more portions of the data is a single byte of the data.

4. The system of claim 1, wherein the number associated with the respective portion of the data is a number based on American Standard Code for Information Interchange (ASCII) mapping for the respective portion of the data, and wherein the number of transmittal tokens that are pseudo randomly generated is based on the ASCII mapping for the respective portion of the data.

5. The system of claim 1, wherein each of the number of transmittal tokens that are pseudo randomly generated are pseudo randomly generated in real time.

6. The system of claim 1, wherein each transmittal token of the number of transmittal tokens that are pseudo randomly generated is 2-32 bytes.

7. The system of claim 1, wherein the first computing device is a sensor, a microcontroller, a remote control, or a key fob.

8. The system of claim 1, wherein the number of transmittal tokens that are pseudo randomly generated is equal to the number associated with the respective portion of the data.

9. The system of claim 1, wherein the selected at least one transmittal token is the last generated transmittal token from the number of transmittal tokens that are pseudo randomly generated.

10. The system of claim 1, wherein the system further comprises the second computing device.

11. The system of claim 1, wherein the number associated with the respective portion of the data is determined based on a binary representation of the respective portion of the data.

12. A method, comprising:

determining, by one or more processors of a first computing device, data for transmittal to a second computing device;

breaking, by the one or more processors of the first computing device, the data into one or more portions;

for each of the one or more portions of the data:

determining, by the one or more processors of the first computing device, a number associated with the respective portion of the data;

pseudo randomly generating, by the one or more processors of the first computing device and utilizing a first set of one or more pseudo random bit generators, a number of transmittal tokens, wherein the number of transmittal tokens that are pseudo randomly generated is based on the number associated with the respective portion of the data;

selecting, by the one or more processors of the first computing device, at least one transmittal token from the number of transmittal tokens that are pseudo randomly generated; and replacing, by the one or more processors of the first computing device, the respective portion of the data with the selected at least one transmittal token; and transmitting, by the one or more processors of the first computing device, the one or more selected transmittal tokens for receipt by the second computing device;

receiving, by one or more processors of the second computing device, the one or more selected transmittal tokens;

for each of the one or more received transmittal tokens:

pseudo randomly generating, by the one or more processors of the second computing device and utilizing a second set of one or more pseudo random bit generators, one or more reception tokens until one of the reception tokens of the one or more reception tokens matches the respective received transmittal token, wherein the second set of one or more pseudo random bit generators is synchronized with the first set of one or more pseudo random bit generators; and determining, by the one or more processors of the second computing device, the respective portion of the data based on a number of generated reception tokens;

rebuilding, by the one or more processors of the second computing device, the data using the one or more determined portions of the data; and transmitting, by the one or more processors of the second computing device, the data for use.

13. The method of claim 12, wherein the data is not transmitted for receipt by the second computing device.

14. The method of claim 12, wherein the number of transmittal tokens that are pseudo randomly generated is equal to the number associated with the respective portion of the data.

15. The method of claim 12, wherein the selected at least one transmittal token is the last generated transmittal token from the number of transmittal tokens that are pseudo randomly generated.

16. A tangible non-transitory computer readable medium comprising logic configured, when executed by one or more processors of a first computing device, to:

determine data for transmittal to a second computing device;

break the data into one or more portions;

for each of the one or more portions of the data:

determine a number associated with the respective portion of the data;

pseudo randomly generate a number of transmittal tokens, utilizing a first set of one or more pseudo random bit generators, wherein the number of transmittal tokens that are pseudo randomly generated is based on the number associated with the respective portion of the data;

select at least one transmittal token from the number of transmittal tokens that are pseudo randomly generated; and replace the respective portion of the data with the selected at least one transmittal token; and transmit the one or more selected transmittal tokens for receipt by the second computing device;

wherein the second computing device is configured to:

receive the one or more selected transmittal tokens;

for each of the one or more received transmittal tokens:

pseudo randomly generate one or more reception tokens, utilizing a second set of one or more pseudo random bit generators, until one of the reception tokens of the one or more reception tokens matches the respective received transmittal token, wherein the second set of one or more pseudo random bit generators is synchronized with the first set of one or more pseudo random bit generators; and determine the respective portion of the data based on a number of generated reception tokens;

rebuild the data using the one or more determined portions of the data; and transmit the data for use.

17. The tangible non-transitory computer readable medium of claim 16, wherein the data is not transmitted for receipt by the second computing device.

18. The tangible non-transitory computer readable medium of claim 16, wherein the number of transmittal tokens that are pseudo randomly generated is equal to the number associated with the respective portion of the data.

19. The tangible non-transitory computer readable medium of claim 16, wherein the selected at least one transmittal token is the last generated transmittal token from the number of transmittal tokens that are pseudo randomly generated.

* * * * *